(12) United States Patent
Dueholm et al.

(10) Patent No.: US 12,727,575 B2
(45) Date of Patent: Sep. 8, 2026

(54) SYSTEM AND COMPUTER-IMPLEMENTED METHOD FOR DETERMINING AN OFFSET FOR A MILKING TOOL IN AN AUTOMATIC MILKING MACHINE, COMPUTER PROGRAM AND NON-VOLATILE DATA CARRIER

(71) Applicant: DELAVAL HOLDING AB, Tumba (SE)

(72) Inventors: Anders Dueholm, Tumba (SE); Andreas Eriksson, Tumba (SE)

(73) Assignee: DeLaval Holding AB, Tumba (SE)

( * ) Notice: Subject to any disclaimer, the term of this patent is extended or adjusted under 35 U.S.C. 154(b) by 448 days.

(21) Appl. No.: 17/923,428

(22) PCT Filed: May 4, 2021

(86) PCT No.: PCT/SE2021/050415
§ 371 (c)(1),
(2) Date: Nov. 4, 2022

(87) PCT Pub. No.: WO2021/225503
PCT Pub. Date: Nov. 11, 2021

(65) Prior Publication Data

US 2023/0210081 A1 Jul. 6, 2023

(30) Foreign Application Priority Data

May 6, 2020 (SE) .................................... 2050518-6

(51) Int. Cl.
*A01J 5/017* (2006.01)

(52) U.S. Cl.
CPC .................................... *A01J 5/0175* (2013.01)

(58) Field of Classification Search
None
See application file for complete search history.

(56) References Cited

U.S. PATENT DOCUMENTS 10,477,828 B2 * 11/2019 Hofman ................. B25J 9/0027
2012/0204807 A1 * 8/2012 Hofman .................. A01J 5/007 119/670

(Continued)

FOREIGN PATENT DOCUMENTS

EP 1 537 775 6/2005
EP 2 059 834 B1 5/2013

(Continued)

OTHER PUBLICATIONS

Search Report for SE Application No. 2050518-6 dated Jan. 15, 2021, 3 pages.

(Continued)

*Primary Examiner* — Hua Lu
(74) *Attorney, Agent, or Firm* — NIXON & VANDERHYE

(57) ABSTRACT

An offset for a first milking tool in a tool carrier of an automatic milking machine is determined as a spatial vector between a tool reference position (TRP) and an estimated actual position (TAP) of the milking tool. A three-dimensional image data is registered that represents a teat (T) during attachment to and/or detachment from the milking tool. The image data is processed by searching, within a search zone, for a predefined part (MP) of the teat (T) while the teat (T) is attached to the milking tool. Provided that the predefined part (MP) fulfills a measurement criterion, a distance ($d_{off}$) is calculated between a specific point of the predefined part (MP) and the tool reference position (TRP). The offset is then determined based on the calculated distance ($d_{off}$).

20 Claims, 3 Drawing Sheets

(56) References Cited

U.S. PATENT DOCUMENTS

| | | | | |
|---|---|---|---|---|
| 2012/0275661 | A1* | 11/2012 | Hofman | H04N 7/183 382/110 |
| 2012/0275894 | A1* | 11/2012 | Hofman | B25J 9/104 414/730 |
| 2014/0000520 | A1* | 1/2014 | Bareket | A01J 5/0175 119/14.08 |
| 2014/0029797 | A1* | 1/2014 | Eriksson | A01J 5/0175 382/103 |
| 2015/0000601 | A1* | 1/2015 | Mostert | A01K 1/126 119/14.08 |
| 2015/0059649 | A1* | 3/2015 | van der Sluis | A01J 5/0175 119/14.08 |
| 2017/0116726 | A1* | 4/2017 | Hofman | H04N 13/204 |
| 2018/0049390 | A1* | 2/2018 | Foresman | G06T 7/75 |
| 2018/0049391 | A1* | 2/2018 | Foresman | A01J 7/00 |
| 2018/0049392 | A1* | 2/2018 | Foresman | A01J 5/0175 |
| 2018/0213742 | A1* | 8/2018 | Jagodzinski | A01J 5/0175 |
| 2018/0228116 | A1* | 8/2018 | Hofman | A01J 5/007 |
| 2018/0235169 | A1* | 8/2018 | Hofman | A01J 5/007 |
| 2019/0180092 | A1* | 6/2019 | Foresman | G06F 18/2113 |
| 2019/0188820 | A1* | 6/2019 | Foresman | A01J 5/0175 |
| 2019/0230890 | A1* | 8/2019 | Henry | B25J 9/1697 |
| 2019/0244350 | A1* | 8/2019 | Miodini | A61B 5/7267 |

FOREIGN PATENT DOCUMENTS

| | | |
|---|---|---|
| EP | 3 685 659 | 7/2020 |
| SE | 528237 | 10/2006 |
| WO | 2012/081972 | 6/2012 |
| WO | 2018/035336 | 2/2018 |

OTHER PUBLICATIONS

International Search Report for PCT/SE2021/050415 dated Jul. 9, 2021, 2 pages.

Written Opinion of the ISA for PCT/SE2021/050415 dated Jul. 9, 2021, 6 pages.

* cited by examiner

T
SZ
TAP
MP
TRP
210
435
430
220
100

T
$d_{off}$
MP
TRP
TAP
210
435
430
220 y
210
T
MP
x
TRP
TAP
$d_{off} = 0$ y
210
TRP
T
TAP
$d_{off}$
x
MP
$d_{off} = (x_1, y_1)$ y
210
T
MP
x
TRP
TAP
$d_{off} = 0$ y
TAP
MP
$d_{off}$
TRP
x
210
$d_{off} = (x_2, y_2)$

SYSTEM AND COMPUTER-IMPLEMENTED METHOD FOR DETERMINING AN OFFSET FOR A MILKING TOOL IN AN AUTOMATIC MILKING MACHINE, COMPUTER PROGRAM AND NON-VOLATILE DATA CARRIER

CROSS-REFERENCE TO RELATED APPLICATIONS

This application is the U.S. national phase of International Application No. PCT/SE2021/050415 filed May 4, 2021 which designated the U.S. and claims priority to SE 2050518-6 filed May 6, 2020, the entire contents of each of which are hereby incorporated by reference.

TECHNICAL FIELD

The present invention relates generally to automatic milking of animals. In particular, the invention relates to a system for determining an offset for milking tool in a tool carrier of an automatic milking machine and a corresponding computer-implemented method. The invention also relates to a computer program implementing the proposed method and a non-volatile data carrier storing the computer program.

BACKGROUND

Today's automatic milking arrangements are highly complex installations. This is particularly true in scenarios where the milking procedure is handled in a fully automated manner by means of one or more milking robots that serve a number of milking stations. In such a case, the milking robot attaches teatcups and other tools, e.g. teat cleaning cups, to the animals without any human interaction. To ensure reliable operation, inter alia when attaching milking tools to an animal's teats, it is important that the milking robot obtains highly accurate data about the respective position for each milking tool in the tool carrier. Otherwise, the animal may be injured and/or the milking may be impaired, for example because the milking tool cannot be attached, or is improperly attached.

EP 2 059 834 describes an implement for automatically milking a dairy animal, such as a cow. The implement contains a milking parlor, a sensor for observing a teat and a milking robot for automatically attaching a teat cup to the teat. The milking robot, in turn, contains a robot control that is connected to the sensor. The sensor includes a radiation source for emitting light, a receiver for receiving electromagnetic radiation reflected from the dairy animal, a lens, and sensor control means. The sensor contains a matrix with a plurality of rows and a plurality of columns of receivers. The sensor control means are designed to determine for each of the receivers a phase difference between the emitted and the reflected electromagnetic radiation in order to calculate the distance from the sensor to a plurality of points on the part to be observed of the dairy animal.

As a result, the milking robot has a relatively good chance of being moved in an appropriate direction when being controlled to attach and detach teat cups. However, the accuracy may be insufficient. Specifically, to accomplish good attachment of the milking tools, the milking robot must have very accurate information about a respective tool center point of each milking tool. For example, due to tolerances and wear of the grippers, it is typically not sufficient to use a set of position coordinates derived from a technical specification of the milking installation.

SUMMARY

The object of the present invention is therefore to provide high-quality tool position data, and thus enable reliable attachment of milking tools to the teats of dairy animals, such as cows; and consequently, facilitate efficient and animal-friendly milk production.

According to one aspect of the invention, the object is achieved by a system for determining an offset for a first milking tool, which offset designates a spatial vector between a tool reference position and an estimated actual position of the first milking tool in a tool carrier of an automatic milking machine. The system includes a camera and a control unit. The camera, which may be a time-of-flight (TOF) camera, a stereo camera, a laser-assisted two-dimensional (2D) camera, a 2D camera in conjunction with structured-light illumination or an ultrasonic imaging device is configured to register three-dimensional (3D) image data representing a teat during attachment of the first milking tool to the teat and/or detachment of the first milking tool from the teat. The control unit is configured to receive the image data from the camera, and process the image data. The image processing involves searching, within a search zone, for a predefined part of the teat while the teat is attached to the first milking tool, which predefined part fulfills a measurement criterion. In response to finding the predefined part, a distance between a specific point, e.g. the center point, of the predefined part and the tool reference position is calculated. The offset is determined based on the calculated distance, for instance as a set of differential coordinates expressing the spatial vector with a starting point at the tool reference position and an end point at the estimated actual position.

This system is advantageous because it provides consistent information about the actual tool positions. Moreover, for further improved accuracy, a number of successful attachments and/or detachments may be used as a statistical basis for a qualified estimate of the actual tool position. The system can also be used to repeatedly adjust the tool positions of a milking machine in operation, since the actual tool positions may be slightly shifted over time due to wear, for example in the toll carrier gripper means.

According to one embodiment of this aspect of the invention, the predefined part contains a surface area of the teat, and the measurement criterion means that surface area in question is located closer to the camera than any other surface area of the teat within the search zone. In other words, the actual tool position is determined based on a distance measurement to a nearest surface area on the teat skin that is located within a predefined image segment. This has proven to be a useful strategy because the teat is composed of flexible tissue and can therefore accommodate for moderate position variations, and at the same time, the teat constitutes an unambiguous basis for measurements.

Preferably, the surface area contains image data from a number of pixels representing elements of the teat, where each of the pixels is associated with a value designating a respective distance to the camera. The control unit is further configured to determine that the surface area is located closer to the camera than any other surface element of the teat based on an average of the values designating the respective distances to the camera. Such averaging is advantageous because it avoids measurement errors resulting from single faults in the pixel distance values.

The search zone is preferably defined based on the tool reference position. Namely, this clearly identifies and delimits the image data to be processed by the control unit.

According to another embodiment of this aspect of the invention, the search zone is a volume in space, and the 3D image data contains voxels. Here, the measurement criterion designates a volume element in the form of a predefined part positioned in a geometric center of a particular level of the cross-section segment of the teat within the search zone. Thus, the actual tool position is determined based on a distance measurement to the physical core of the teat. This provides robust result data since the risk of measurements artifacts can be made very low.

According to still another embodiment of this aspect of the invention, the search zone includes a part of the registered 3D image data that is estimated to represent a portion of the teat located above a mouthpiece of the first milking tool, which mouthpiece is configured to receive the teat.

According to yet another embodiment of this aspect of the invention the first milking tool is a teat cup. Here, the control unit is configured to initiate the searching for the predefined part of the teat after that a pressure condition has been fulfilled in a vacuum chamber of the teat cup. Preferably, the pressure condition is considered to be fulfilled when a predefined vacuum level is measured in response to the teat being captured in/sucked into the mouthpiece as a result of the teat cup being controlled to approach the teat. Thus, the pressure condition signals that the teat has entered the teat cup, and the measuring process can be initiated.

According to another embodiment of this aspect of the invention, the first milking tool is a teat cleaning cup. Here, the control unit is instead configured to initiate the searching for said predefined part during withdrawal of the teat cleaning cup from the teat. Namely, the robotic arm typically holds the cleaning cup throughout the entire cleaning procedure. Therefore, the measurement can be triggered by a control signal for removing the teat cleaning cup. Of course, however, the measurement must be concluded before the teat cleaning cup has been completely removed.

According to a further embodiment of this aspect of the invention, the registered 3D image data represent at least one additional teat during attachment of the at least one additional teat to a respective at least one milking tool in addition to the first milking tool and/or detachment of the at least one additional teat from the respective at least one milking tool in addition to the first milking tool. The control unit is here further configured to process the image data by searching, within at least one predefined additional search zone, for a predefined part at the least one additional teat while the at least one additional teat is attached to the at least one additional milking tool, which predefined part fulfills the measurement criterion. In response to finding the predefined part, a distance between a specific point of the predefined part and tool reference position for the at least one additional milking tool is calculated. An offset is then determined for the at least one additional milking tool based on the calculated distance. Consequently, the tool positions for two or more milking tools can be calibrated in parallel.

According to another aspect of the invention, the object is achieved by a computer-implemented method of determining an offset for a first milking tool, which offset designates a spatial vector between a tool reference position and an estimated actual position of the first milking tool in a tool carrier of an automatic milking machine. The method involves processing 3D image data that represent a teat during attachment to and/or detachment from the first milking tool by:

searching, within a search zone, for a predefined part of the teat while the teat is attached to the first milking tool, which predefined part fulfills a measurement criterion;

calculating, in response to the predefined part being found, a distance between a specific point of the predefined part and the tool reference position; and determining said offset based on said calculated distance.

The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figures 1, 2A, 2B, 2C, 2D, 2E, 2F:
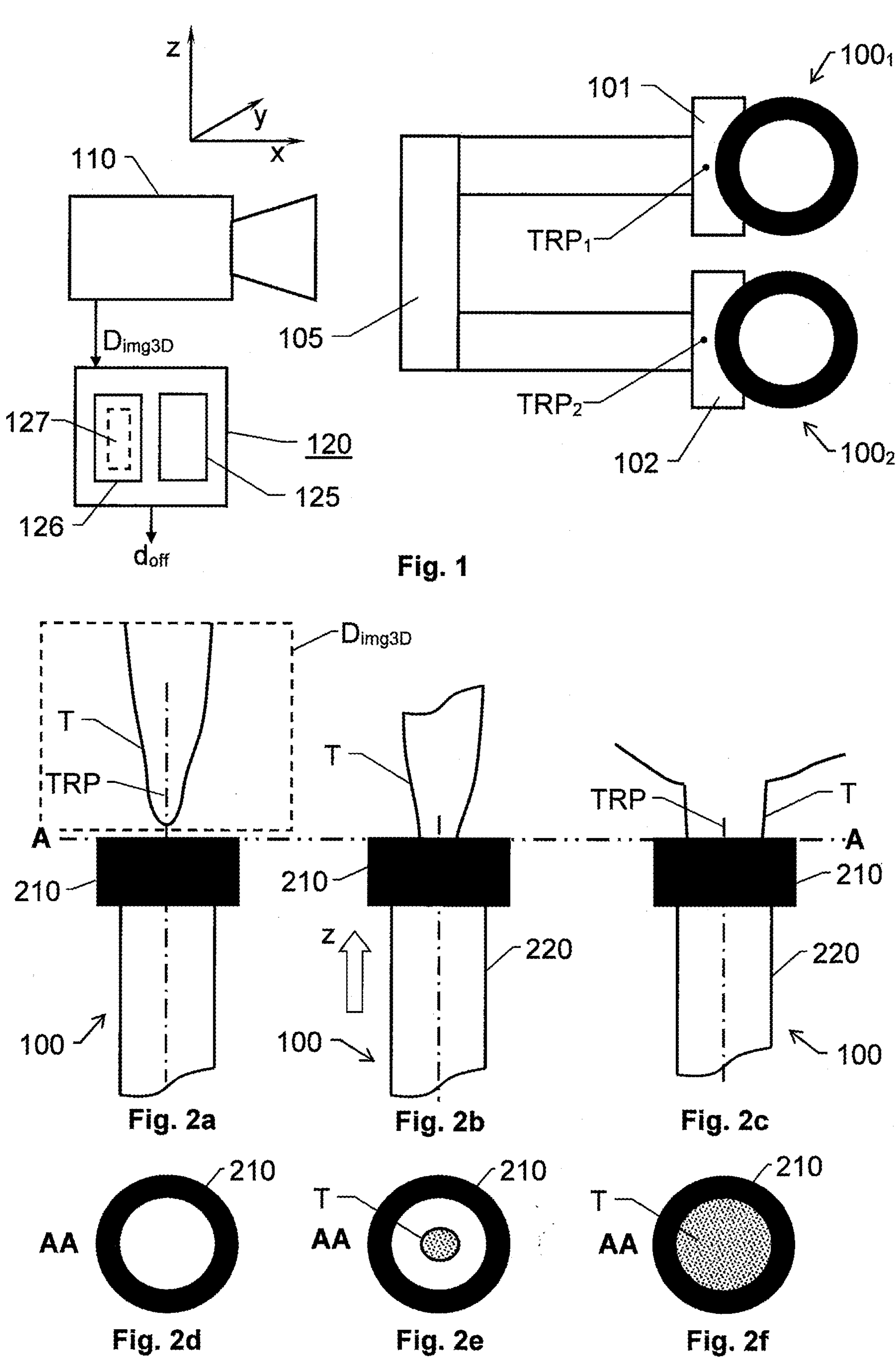
FIG. 1 shows a schematic view of a tool carrier of an automatic milking machine and a block diagram over a system according to one embodiment of the invention.
FIGS. 2*a-f* show side and top views schematically illustrating how a milking tool is attached to the teat of an animal.

In FIG. 1, we see a schematic view of robotic arm 105 with first and second tool carriers 101 and 102 respectively, here exemplified with magnetic grippers, which are arranged to carry first and second milking tools $\mathbf{100}_1$ and $\mathbf{100}_2$ respectively to and possibly from the teats of a dairy animal in connection with milking by an automatic milking machine. The first and second milking tools $\mathbf{100}_1$ and $\mathbf{100}_2$ may for example be represented by teat cups or teat cleaning cups.

FIG. 1 also shows a block diagram over a system according to one embodiment of the invention, which system is configured to determine an offset for the milking tools $\mathbf{100}_1$ and $\mathbf{100}_2$. The offset represents a difference in position between a tool reference position $TRP_2$ and $TRP_1$ respectively and an estimated actual position the milking tools $100_1$ and $100_2$ in the tool carriers 101 and 102 respectively. In other words, the offset designates a spatial vector between the tool reference position $TRP_1$ and $TRP_2$ respectively and the estimated actual position of the milking tool $100_1$ and $100_2$ in a tool carrier 101 and 102 respectively. The offset is undesired, and should, ideally, be zero. However, due to tolerances in the manufacturing and installation processes, such an offset inevitably occurs. Moreover, the offset may vary over time, as a result of component wear, e.g. in the tool carriers 101 and 102. To ensure that the milking robot is capable of controlling the milking tools $100_1$ and $100_2$ as intended it is therefore important that the offset is known, and preferably is updated repeatedly during the life cycle of the milking installation. Namely, the offset may result in impaired milking efficiency and/or animal injuries.

The system includes a camera 110 and a control unit 120. The camera 110 is configured to register 3D image data $D_{img3D}$ representing at least one teat T during attachment of the at least one teat T to a milking tool, e.g. $100_1$, and/or detachment of the at least one teat T from the milking tool, e.g. $100_1$. The control unit 120 is configured to receive the 3D image data $D_{img3D}$ from the camera 110, and process the 3D image data $D_{img3D}$. Specifically, the image processing involves searching, within a search zone SZ, for a predefined part MP of the teat T while the teat T is attached to the milking tool $100_1$, which predefined part MP fulfills a measurement criterion. In response to finding the predefined part MP, the image processing further involves calculating a distance $d_{off}$ between a specific point of the predefined part MP, preferably its center, and the tool reference position $TRP_1$. According to the invention, however, any other well-defined point of the predefined part MP may constitute the specific point, for example a particular point on a border of the predefined part MP. In any case, the image processing also involves determining the offset based on said calculated distance $d_{off}$.

Further details of the proposed procedure and the image processing will be described below referring to FIGS. 2 to 8.

FIGS. 2*a* to 2*c* show side views schematically illustrating how a milking tool 100 is attached to the teat T of an animal when there is no offset for the milking tool 100. FIGS. 2*d* to 2*f* show top views of the milking tool 100 and the teat T corresponding to FIGS. 2*a* to 2*c* respectively along a cross-section line AA.

More precisely, in practice, the non-offset situation shown in FIGS. 2*a* to 2*f* means that any offset that may have existed earlier has been compensated for, for example by applying the present invention, so that the tool reference position coincides with the actual position for the milking tool 100.

FIGS. 2*a* and 2*d* illustrate a point in time when the robotic arm 105 has brought the milking tool 100 to such a position close to the teat T that a mouthpiece 210 of the milking tool 100 is located with a center point of the milking tool 100 beneath a tip of the teat T. Here, for convenience, the center point has been set equal to the tool reference position TRP. According to the invention, however, any point on the milking tool 100 can be selected as the tool reference position TRP provided this point is unambiguous. The camera 110 registers 3D image data $D_{img3D}$ with a general framing as shown by the dashed box, i.e. including at least a tip portion of the teat T, however not the milking tool 100.

FIGS. 2*b* and 2*e* illustrate a point in time when the robotic arm 105 has started to elevate the milking tool 100 in the form of a teat cup vertically along an axis parallel the tool reference position TRP, so that an outermost tip of the teat T has entered the milking tool 100. In this example, the tool reference position TRP has been defined in an xy plane (cf. FIG. 1). Thus, the milking tool 100 is here elevated along an axis z orthogonal to the xy plane while keeping the x and y coordinates fixed at the tool reference position TRP.

FIGS. 2*c* and 2*f* illustrate a point in time when robotic arm has elevated the milking tool 100 high enough for the teat T to be sucked into the milking tool 100 as a result of a sub-atmospheric pressure applied therein. Consequently, the teat T fills out the entire cross section of the teat cup 100; and this condition can be detected by measuring a pressure level in the teat cup 100.

Figures 3A, 3B, 3C, 8:
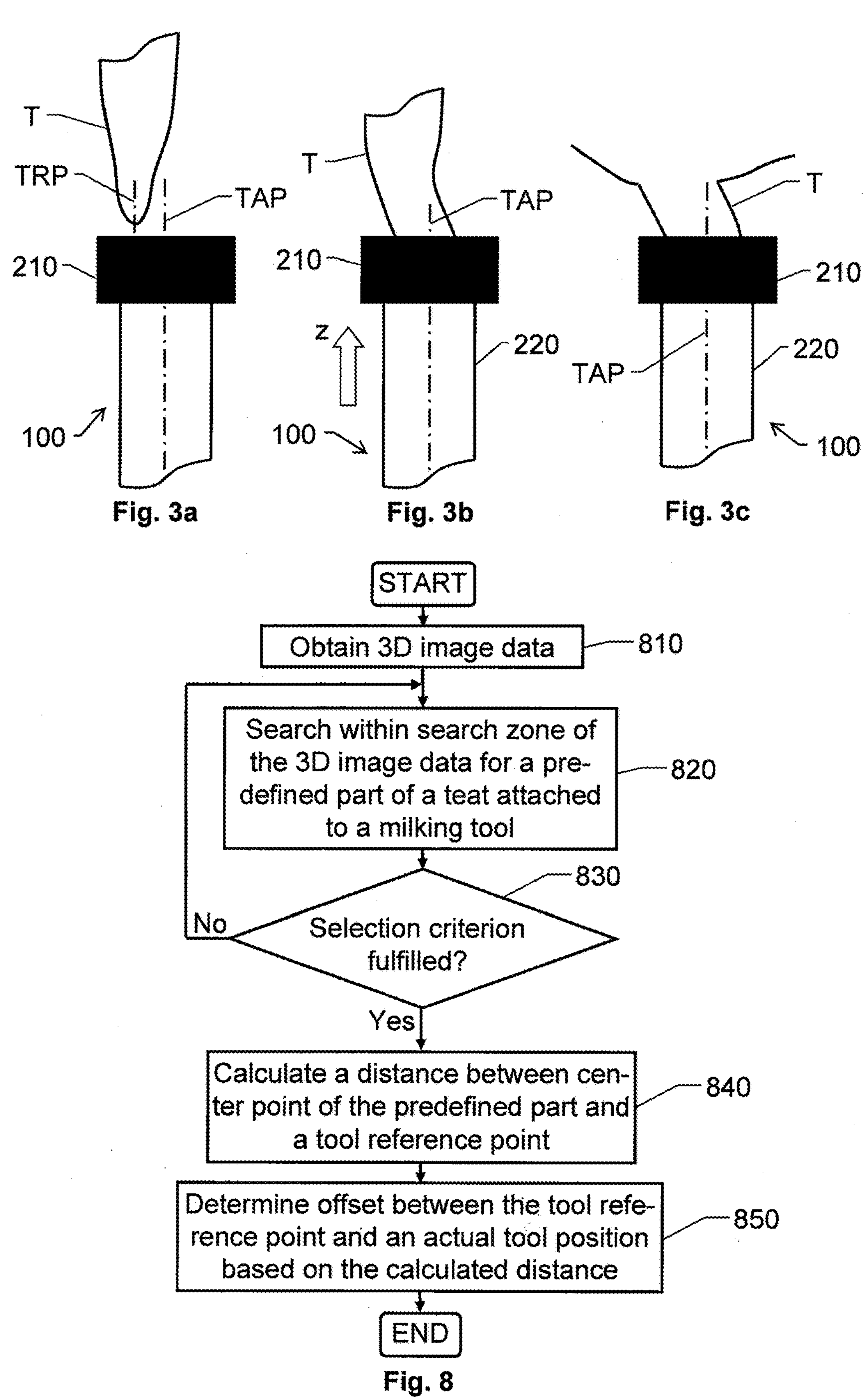
FIGS. 3*a-c* show side views schematically illustrating how an offset milking tool is attached to the teat of an animal according to one embodiment of the invention.
FIG. 8 illustrates, by means of a flow diagram, the general method according to the invention.

FIGS. 3*a* to 3*c* show side views analogous to those in FIGS. 2*a* to 2*c* respectively, however where there is an offset between the tool reference position TRP and an actual tool position TAP for the milking tool 100. This means that the robotic arm controller assumes that the robotic arm 105 has brought the milking tool 100 (e.g. a teat cup) to the position illustrated in FIG. 2*a*. However, the milking tool 100 is, in fact, located at the actual tool position TAP being slightly offset therefrom.

In this example, a magnitude of the offset between the tool reference position TRP and the actual tool position TAP is small enough to allow the outermost tip of the teat T to be introduced in the mouthpiece 210 of the milking tool 100 when the robotic arm 105 elevates the milking tool 100 in the z direction as shown in FIG. 3*b*. However, due to the offset, the teat T becomes slightly bent and/or shape changed.

This effect is apparent also in FIG. 3*c*, when the teat T has been sucked into the milking tool 100 by said sub-atmospheric pressure. Relatively small offsets between the tool reference position TRP and the actual tool position TAP can thus be accepted because the teat T is composed of flexible tissue. Of course, at such offsets the teat T is exerted to unnecessary mechanical stress that may have negative influence on the milk extraction. It is therefore desirable to compensate also for smaller offsets. Naturally, if the offset is too large, the outermost tip of the teat T will miss the mouthpiece 210 when the milking tool 100 is elevated, and as a result, no milk will be extracted, or the teat will not be cleaned depending on the milking tool used.

Figures 4, 5, 6A, 6B, 7A, 7B:
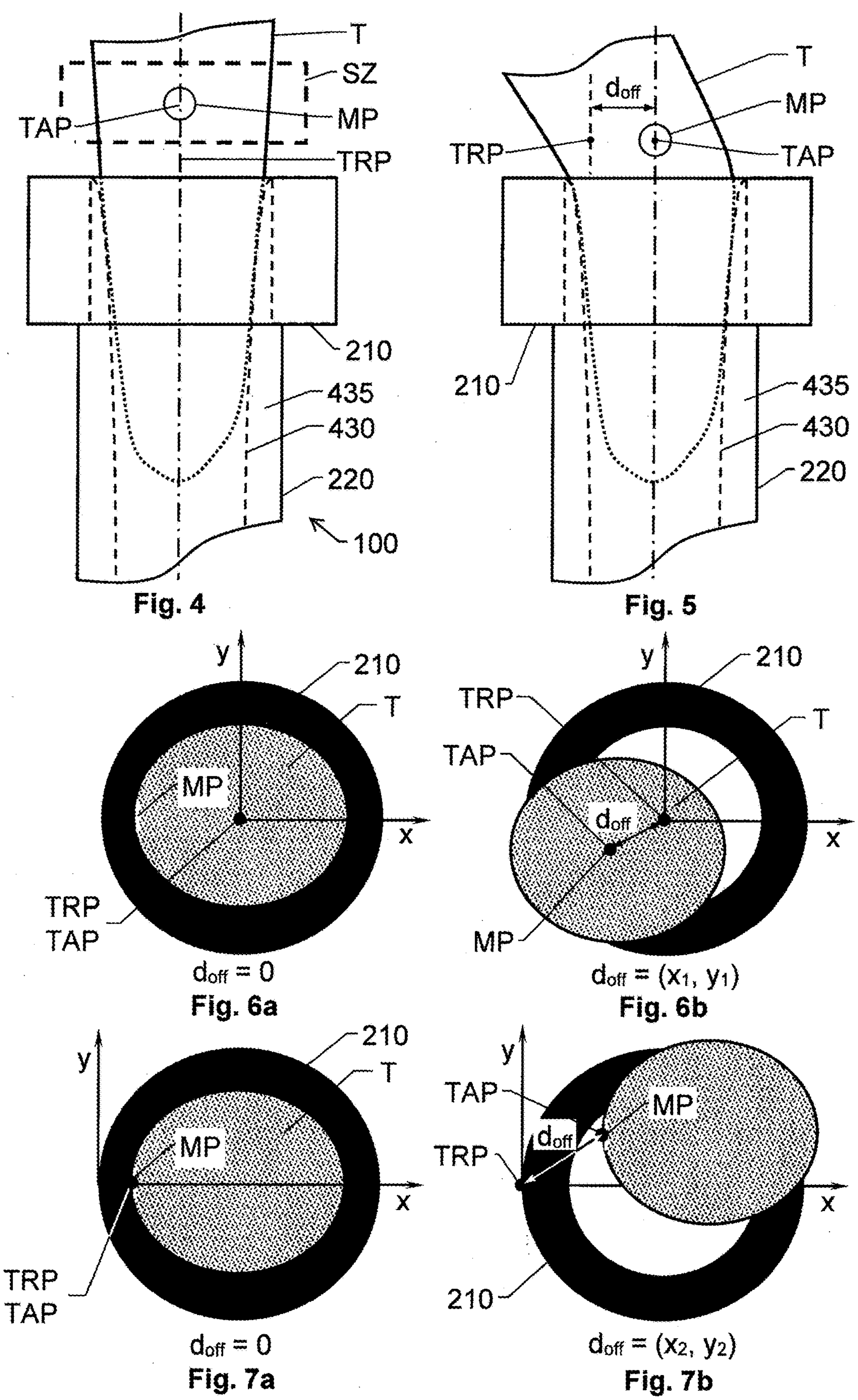
FIGS. 4-5 show side views that illustrate in further detail how an aligned and an offset milking tool respectively is attached to the teat of an animal.
FIGS. 6*a-b* show top views schematically illustrating how a milking tool is attached to the teat of an animal according to a first embodiment of the invention.
FIGS. 7*a-b* show top views schematically illustrating how a milking tool is attached to the teat of an animal according to a second embodiment of the invention.

Referring now to FIGS. 4 and 5, we will explain how the offset is determined according to the invention. FIGS. 4 and 5 both show cross-section side views of a milking tool 100 in the form of a teat cup that is attached to the teat T of an animal. A shell 220 constitutes a main body of the milking tool 100. The shell 220 contains a liner 430, which is a flexible component that comes into contact with the teat T during milking. Specifically, a pulsating sub-atmospheric pressure is applied in a space 435 between the inner wall of the shell 220 and the liner 430, which space constitutes a vacuum chamber. The sub-atmospheric pressure assists in extracting milk from the teat T, and the pulsations warrant for that the milk is forwarded to a milk line system in a controlled manner.

As mentioned above, the processing of the 3D image data $D_{img3D}$ involves searching, within a search zone SZ, for a predefined part MP of the teat T while the teat T is attached to the milking tool 100, which predefined part MP fulfills a measurement criterion. In FIG. 4, the search zone SZ is illustrated by a dashed box, i.e. a data domain within the general framing in FIG. 2*a*.

The search zone SZ contains a part of the registered 3D image data $D_{img3D}$ that is estimated to represent a portion of said teat T being located above a mouthpiece 210 of the milking tool 100, which mouthpiece 210 is configured to receive the teat T. The search zone SZ is thus preferably defined based on the tool reference position TRP.

In response to finding the predefined part MP, a distance is calculated between a specific point of the predefined part MP and the tool reference position TRP. The offset is then determined based on the calculated distance. FIG. 4 illustrates a situation with zero offset, i.e. where the actual position TAP coincides with the tool reference position TRP.

In FIG. 5, a non-zero offset $d_{off}$ is measured between the tool reference position TRP and the actual position TAP. Namely, this offset $d_{off}$ has caused the robotic arm 105 to bring the milking tool to a position where the milking tool 100 is not centered beneath the outermost tip of the teat T as in FIG. 3*a*.

According to one embodiment of the invention, the predefined part contains a surface area MP of the teat T, and the measurement criterion means that the surface area MP is located closer to the camera 110 than any other surface area of the teat T within the search zone SZ.

The surface area MP, in turn, preferably includes image data from a number of pixels representing elements of the teat T. Each of said pixels is associated with a value designating a respective distance to the camera 110. In a TOF camera, this data is readily available, whereas in other kinds of 3D cameras such a distance value may need to be calculated in the control unit 120. In any case, in this embodiment of the invention, the control unit 120 is configured to determine that the surface area MP is located closer to the camera 110 than any other surface element of the teat T based on an average of said values designating the respective distances to the camera 110. The measurement is thereby made relatively robust, since measurement errors resulting from single faults in the pixel distance values is avoided.

According to one embodiment of the invention, the first milking tool 100 is a teat cup. Here, to ensure that the teat T is located in the teat cup, the control unit 120 is configured to initiate the searching for the predefined part MP after that a pressure condition has been fulfilled in the vacuum chamber 435 of the teat cup 110. Namely, a distinct pressure change occurs in the vacuum chamber 435 when the teat T fills the full diameter of the mouthpiece 210, and thus seals the spacing between the liner 430 and the teat T.

According to another embodiment of the invention, the milking tool 100 is a teat cleaning cup. Here, the control unit 120 is configured to initiate the searching for the predefined part MP during withdrawal of the teat cleaning cup from the teat T, i.e. an action opposite the above-described attachment. In contrast to milk extraction, cleaning is typically not performed in response to a signal from a pressure sensor. Therefore, the abovementioned pressure variations cannot be used to trigger the measurement. Instead, a withdrawal signal to the robotic arm 105 is preferably used as a measurement trigger.

FIGS. 6*a* and 6*b* show top views equivalent to the side views of FIGS. 4 and 5 respectively. Thus, in FIG. 6*a*, the actual position TAP coincides with the tool reference position TRP.

The search zone SZ is here a volume in space, and the 3D image data $D_{img3D}$ contains voxels. Thus, the measurement criterion designates a volume element in the form of a predefined part MP positioned in a geometric center of a particular level of the cross-section segment of the teat T within the search zone SZ. Said volume element, in turn, may be represented by one or more voxels in the 3D image data $D_{img3D}$.

In FIG. 6*b*, there is an offset $d_{off}$: $(x_1, y_1)$ between the actual position TAP and the tool reference position TRP. Therefore, since the search zone SZ does not include the milking tool 100, a vertical projection of a cross-section of the teat T does not necessarily cover the entire diameter of the milking tool 100 at a z-level where the measurement condition is fulfilled.

FIGS. 7*a* and 7*b* show top views schematically illustrating how a milking tool 100 is attached to the teat T of an animal. Thus, in FIG. 7*a*, the actual position TAP coincides with the tool reference position TRP.

Here, the predefined part MP is defined as the surface area MP that is located closer to the camera 110 than any other surface element of the teat T within the search zone SZ. Further, a point on the mouthpiece 210 has been selected as the tool reference position TRP.

In FIG. 7*b*, there is an offset $d_{off}$: $(x_2, y_2)$ between the actual position TAP and the tool reference position TRP. Therefore, again, since the search zone SZ does not include the milking tool 100, a vertical projection of a cross-section of the teat T does not necessarily cover the entire diameter of the milking tool 100 at a z-level where the measurement condition is fulfilled.

Referring now once more to FIG. 1, according to one embodiment of the invention, the registered 3D image data $D_{img3D}$ represent at least one additional teat T during attachment of the at least one additional teat T to a respective at least one milking tool 100$_2$) in addition to a first milking tool 100$_1$ and/or detachment of the at least one additional teat T from the respective at least one milking tool 100$_2$ in addition to the first milking tool 100$_1$. In this embodiment, the control unit 120 is further configured to process the 3D image data $D_{img3D}$ as follows:

searching, within at least one predefined additional search zone SZ, for a predefined part MP at the least one additional teat T while the at least one additional teat T is attached to the at least one additional milking tool 100$_1$, which predefined part (MP) fulfills the measurement criterion;

calculating, in response to the predefined part MP being found, a distance $d_{off}$ between a specific point of the predefined part MP and tool reference position $TRP_2$ for the at least one additional milking tool 100$_2$; and determining an offset for the at least one additional milking tool 100$_2$ based on the calculated distance $d_{off}$.

Thereby, the individual offsets for two or more milking tools can be determined in parallel. Of course, this renders the overall calibration process more efficient.

It is generally advantageous if the control unit 120 is configured to effect the above-described procedure in an automatic manner by executing a computer program 127. Therefore, the control unit 120 may include a memory unit 125, i.e. non-volatile data carrier, storing the computer program 127, which, in turn, contains software for making processing circuitry in the form of at least one processor 125 in the central control unit 120 execute the above-described actions when the computer program 127 is run on the at least one processor 125.

In order to sum up, and with reference to the flow diagram in FIG. 8, we will now describe the general method according to the invention of determining an offset for a first milking tool, which offset designates a spatial vector between a tool reference position and an estimated actual position of the first milking tool in a tool carrier of an automatic milking machine.

In a first step 810, 3D image data are obtained from a camera, for instance a TOF camera, a stereo camera, a laser-assisted two-dimensional camera or an ultrasonic imaging device.

Then, in a step 820, the 3D image data is processed by searching, within a search zone, for a predefined part of the teat while the teat is attached to a milking tool.

A subsequent step 830 checks if a predefined part has been found, which fulfills a measurement criterion. The measurement criterion may mean that the surface area is located closer to the camera than any other surface area of the teat within the search zone. Alternatively, if the camera is an ultrasonic imaging device, the search zone may be a volume in space. In such a case, the 3D image data contains voxels; and here the measurement criterion designates a volume element in the form of a predefined part positioned in a geometric center of a particular level of the cross-section segment of the teat within the search zone. In response to the selection criterion being fulfilled, the procedure continues to a step 840. Otherwise, the procedure loops back to step 820.

In step 840, a distance is calculated between a specific point of the predefined part and the tool reference position. In a step 850 thereafter, the offset is determined based on the distance calculated in step 840. For example, the offset may be determined as a set of differential coordinates expressing a spatial vector with a starting point at the tool reference position and an end point at the estimated actual position. After step 850 the procedure ends.

All of the process steps, as well as any sub-sequence of steps, described with reference to FIG. 8 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for determining an offset for a first milking tool (100, $100_1$), which offset designates a spatial vector between a tool reference position (TRP, $TRP_1$) and an estimated actual position (TAP) of the first milking tool (100, $100_1$) in a tool carrier (101) of an automatic milking machine, the system comprising:

- a camera (110) configured to register three-dimensional image data ($D_{img3D}$) representing a teat (T) during attachment to and/or detachment from the first milking tool (100, $100_1$); and
- a control unit (120) configured to receive the image data ($D_{img3D}$) from the camera (110), and process the image data ($D_{img3D}$) by:
  - searching, within a search zone (SZ), for a predefined part (MP) of the teat (T) while the teat (T) is attached to the first milking tool (100, $100_1$), which predefined part (MP) fulfills a measurement criterion, the search zone (SZ) comprising a part of the registered three-dimensional image data ($D_{img3D}$) that is estimated to represent a portion of said teat (T) being located above a mouthpiece (210) of the first milking tool (100, $100_1$), the mouthpiece (210) being configured to receive the teat (T),
  - calculating, in response to the predefined part (MP) being found, a distance ($d_{off}$) between a specific point of the predefined part (MP) and the tool reference position (TRP, $TRP_1$), and
  - determining said offset based on said calculated distance ($d_{off}$).

2. The system according to claim 1, wherein the predefined part comprises a surface area (MP) of the teat (T), and the measurement criterion is that said surface area (MP) is located closer to the camera (110) than any other surface area of the teat (T) within the search zone (SZ).

3. The system according to claim 2, wherein the surface area (MP) comprises image data from a number of pixels representing elements of the teat (T), each of said pixels being associated with a value designating a respective distance to the camera (110), and the control unit (120) is configured to determine that the surface area (MP) is located closer to the camera (120) than any other surface element of said teat (T) based on an average of said values designating the respective distances to the camera (110).

4. The system according to claim 1, wherein the search zone (SZ) is a volume in space, the three-dimensional image data ($D_{img3D}$) comprises voxels, and the measurement criterion designates a volume element in the form of a predefined part (MP) positioned in a geometric center of a particular level of the cross-section segment of the teat (T) within the search zone (SZ).

5. The system according to claim 1, wherein the control unit (120) is configured to determine said offset as a set of differential coordinates expressing the spatial vector with a starting point at the tool reference position (TRP, $TRP_1$) and an end point at the estimated actual position (TAP).

6. The system according to claim 1, wherein the search zone (SZ) is defined based on the tool reference position (TRP, $TRP_1$).

7. The system according to claim 1, wherein the first milking tool (100, $100_1$) is a teat cup and the control unit (120) is configured to initiate the searching for said predefined part (MP) after that a pressure condition has been fulfilled in a vacuum chamber (435) of the teat cup.

8. The system according to claim 1, wherein the first milking tool (100, $100_1$) is a teat cleaning cup and the control unit (120) is configured to initiate the searching for said predefined part (MP) during withdrawal of the teat cleaning cup from the teat (T).

9. The system according to claim 1, wherein the camera (110) is comprised in the group of: a time-of-flight camera, a stereo camera, a laser-assisted two-dimensional camera, and an ultrasonic imaging device.

10. The system according to claim 1, wherein, the registered three-dimensional image data ($D_{img3D}$) represent at least one additional teat (T) during attachment of the at least one additional teat (T) to a respective at least one milking tool (100, $100_2$) in addition to the first milking tool (100, $100_1$) and/or detachment of the at least one additional teat (T) from the respective at least one milking tool (100, $100_2$) in addition to the first milking tool (100, $100_1$), and the control unit (120) is further configured to process the image data ($D_{img3D}$) by:

searching, within at least one predefined additional search zone (SZ), for a predefined part (MP) at the least one additional teat (T) while the at least one additional teat (T) is attached to the at least one additional milking tool (100, $100_1$), which predefined part (MP) fulfills the measurement criterion, calculating, in response to the predefined part (MP) being found, a distance ($d_{off}$) between a specific point of the predefined part (MP) and tool reference position (TRP, $TRP_2$) for the at least one additional milking tool (100, $100_2$), and determining an offset for the at least one additional milking tool (100, $100_2$) based on said calculated distance ($d_{off}$).

11. A computer-implemented method of determining an offset for a first milking tool (100, $100_1$), which offset designates a spatial vector between a tool reference position (TRP, $TRP_1$) and an estimated actual position (TAP) of the first milking tool (100, $100_1$) in a tool carrier (101) of an automatic milking machine, the method comprising a computer processing three-dimensional image data ($D_{img3D}$) that represent a teat (T) during attachment to and/or detachment from the first milking tool (100, $100_1$) by:

searching, within a search zone (SZ), for a predefined part (MP) of the teat (T) while the teat (T) is attached to the first milking tool (100, $100_1$), which predefined part (MP) fulfills a measurement criterion, the search zone (SZ) comprising a part of the registered three-dimensional image data ($D_{img3D}$) that is estimated to represent a portion of said teat (T) being located above a mouthpiece (210) of the first milking tool (100, $100_1$), the mouthpiece (210) being configured to receive the teat (T), calculating, in response to the predefined part (MP) being found, a distance ($d_{off}$) between a specific point of the predefined part (MP) and the tool reference position (TRP, $TRP_1$) and determining said offset based on said calculated distance ($d_{off}$).

12. The method according to claim 11, wherein the predefined part comprises a surface area (MP) of the teat (T), and the measurement criterion means that said surface area (MP) is located closer to the camera (110) than any other surface area of the teat (T) within the search zone (SZ).

13. The method according to claim 12, wherein the surface area (MP) comprises image data from a number of pixels representing elements of the teat (T), each of said pixels being associated with a value designating a respective distance to the camera (110), and the control unit (120) is configured to determine that the surface area (MP) is located closer to the camera (110) than any other surface element of said teat (T) based on an average of said values designating the respective distances to the camera (110).

14. The method according to claim 11, wherein the search zone (SZ) is a volume in space, the three-dimensional image data ($D_{img3D}$) comprises voxels, and the measurement criterion designates a volume element in the form of a predefined part (MP) positioned in a geometric center of a particular level of the cross-section segment of the teat (T) within the search zone (SZ).

15. The method according to claim 11, further comprising:

determining said offset as a set of differential coordinates expressing the spatial vector with a starting point at the tool reference position (TRP, $TRP_1$) and an end point at the estimated actual position (TAP).

16. The method according to claim 11, wherein the search zone (SZ) is defined based on the tool reference position (TRP, $TRP_1$).

17. The method according to claim 11, wherein the first milking tool (100, $100_1$) is a teat cup and the method comprises:

initiating the searching for the predefined part (MP) after that a pressure condition has been fulfilled in a vacuum chamber (435) of the teat cup.

18. The method according to claim 11, wherein the first milking tool (100, $100_1$) is a teat cleaning cup and the control unit (120) is configured to initiate the searching for the predefined part (MP) during withdrawal of the teat cleaning cup from the teat (T).

19. The method according to claim 11, wherein the registered three-dimensional image data ($D_{img3D}$) represent at least one additional teat (T) during attachment of the at least one additional teat (T) to a respective at least one milking tool (100, $100_2$) in addition to the first milking tool (100, $100_1$) and/or detachment of the at least one additional teat (T) from the respective at least one milking tool (100, $100_2$) in addition to the first milking tool (100, $100_1$), and the processing of the image data ($D_{img3D}$) further comprises:

searching, within at least one predefined additional search zone (SZ), for a predefined part (MP) at the least one additional teat (T) while the at least one additional teat (T) is attached to the at least one additional milking tool (100, $100_1$), which predefined part (MP) fulfills the measurement criterion, calculating, in response to the predefined part (MP) being found, a distance ($d_{off}$) between a specific point of the predefined part (MP) and tool reference position (TRP, $TRP_2$) for the at least one additional milking tool (100, $100_2$), and determining an offset for the at least one additional milking tool (100, $100_2$) based on said calculated distance ($d_{off}$).

20. A non-transitory data carrier (126) containing a computer program (127) communicatively connectable to a processing unit (125), the computer program (127) comprising software for executing the method according to claim 11 when the computer program is run on the processing unit (125).

* * * * *